(12) United States Patent
Li et al.

(10) Patent No.: US 10,837,566 B2
(45) Date of Patent: Nov. 17, 2020

(54) CAP ASSEMBLY INTEGRATED WITH CHECK VALVES

(71) Applicant: Ford Global Technologies LLC, Dearborn, MI (US)

(72) Inventors: Sam Li, Nanjing (CN); Charles Qin, Nanjing (CN)

(73) Assignee: Ford Global Technologies LLC, Dearborn, MI (US)

(*) Notice: Subject to any disclaimer, the term of this patent is extended or adjusted under 35 U.S.C. 154(b) by 344 days.

(21) Appl. No.: 15/995,695

(22) Filed: Jun. 1, 2018

(65) Prior Publication Data
US 2019/0017614 A1    Jan. 17, 2019

(30) Foreign Application Priority Data

Jul. 14, 2017    (CN) .......................... 2017 1 0574297

(51) Int. Cl.
| | |
|---|---|
| *F16K 15/14* | (2006.01) |
| *B65D 51/16* | (2006.01) |
| *B60K 15/04* | (2006.01) |
| *B60K 15/035* | (2006.01) |
| *F16K 17/19* | (2006.01) |

(52) U.S. Cl.
CPC ...... *F16K 15/147* (2013.01); *B60K 15/03519* (2013.01); *B60K 15/0406* (2013.01); *B65D 51/165* (2013.01); *F16K 17/19* (2013.01); *B60K 2015/03547* (2013.01); *B60K 2015/03585* (2013.01)

(58) Field of Classification Search
None
See application file for complete search history.

(56) References Cited

U.S. PATENT DOCUMENTS

| | | | |
|---|---|---|---|
| 3,284,004 A | 11/1966 | MacLennan | |
| 3,861,557 A | 1/1975 | Tupper | |
| 4,165,816 A | 8/1979 | Tupper | |
| 5,377,877 A * | 1/1995 | Brown | B65D 47/2031 222/105 |
| 5,890,620 A * | 4/1999 | Belcastro | A47G 19/2272 215/11.4 |

(Continued)

OTHER PUBLICATIONS http://www.minivalve.com/newsite/index.php/en/by-type/duckbill-valves/how-they-work.
http://www.minivalve.com/newsite/index.php/en/by-type/duckbill-umbrella-combination-valves/how-they-work.
http://www.minivalve.com/newsite/index.php/en/by-type/x-fragm-vaives/how-they-work.

*Primary Examiner* — J. Gregory Pickett
*Assistant Examiner* — Tia Cox
(74) *Attorney, Agent, or Firm* — Geoffrey Brumbaugh Kolitch Romano LLP (57) ABSTRACT

A cap assembly for a container comprises a cap and a body coupled to the cap. The body includes a peripheral wall and a valve seat. The valve seat includes a first side facing the cap and a second side facing away from the cap. A first check valve having an elastic valve body is positioned at the second side of the seat. A second check valve having an elastic valve body is positioned at the first side of the valve seat. When a pressure at the first side of the valve seat exceeds a pressure at the second side of the valve seat by a first predetermined value, the first check valve opens; and when the pressure at the second side exceeds the pressure at the first side by a second predetermined value, the second check valve opens.

20 Claims, 8 Drawing Sheets

(56) References Cited

U.S. PATENT DOCUMENTS

| | | | |
|---|---|---|---|
| 6,269,968 B1* | 8/2001 | Belcastro | A47G 19/2272 |
| | | | 220/203.18 |
| 6,679,396 B1* | 1/2004 | Foltz | B60K 15/04 |
| | | | 141/301 |
| 7,789,263 B2* | 9/2010 | Hakim | B65D 47/2031 |
| | | | 220/714 |
| 9,193,507 B2 | 11/2015 | Aljajawi et al. | |
| 2003/0024397 A1* | 2/2003 | Meiller | F02M 25/0854 |
| | | | 96/139 |
| 2003/0042452 A1* | 3/2003 | Burke | F02M 25/0836 |
| | | | 251/129.15 |
| 2007/0151628 A1* | 7/2007 | Thompson | B60K 15/03504 |
| | | | 141/326 |
| 2013/0292493 A1 | 11/2013 | Marsalek et al. | |

* cited by examiner

CAP ASSEMBLY INTEGRATED WITH CHECK VALVES

RELATED APPLICATION

This application claims the benefit of Chinese Patent Application No.: CN201710574297.6, filed Jul. 14, 2017, the entire contents thereof being incorporated herein by reference.

FIELD

The present disclosure relates to a cap assembly integrated with check valves.

BACKGROUND

Vehicles generally include different fluid storage devices. To ensure a normal operation, the pressure inside the fluid storage devices are maintained within a predetermined pressure range. For instance, a vehicle fuel tank may be subjected to different temperatures and operation conditions. Fuel vapor may accumulate and generate an increased pressure in the fuel tank at certain conditions while fuel vapor pressure may be lower and generate vacuum in the fuel tank at some operation conditions of the engine. A greater pressure or a vacuum in the fuel tank may cause some issues such as deformation of the fuel tank. Fuel tank vent valves have been developed to solve the issues.

U.S. Pat. No. 4,165,816 discloses a cap with a check relief valve element. The cap comprises an improved top wall assembly including the check valve element and spring for pressure relief.

The inventors of the present disclosure have realized that there exists a need to improve the vent valves and cap assemblies in terms of durability, NVH performance.

SUMMARY

According to one aspect of the present disclosure, a cap assembly for a container is provided. The cap assembly may comprise a cap and a body coupled to the cap. The body may include a peripheral wall and a valve seat extending from the peripheral wall to the central axis of the body. The valve seat may include a first side facing the cap and a second side facing away from the cap. A first check valve made of elastic material having a first valve body may be positioned at the second side of the seat. A second check valve made of elastic material having a second valve body may be positioned at the first side of the valve seat. When a pressure at the first side of the valve seat exceeds a pressure at the second side of the valve seat by a first predetermined value, the first check valve may open; and when the pressure at the second side exceeds the pressure at the first side by a second predetermined value, the second check valve may open.

In one embodiment, the cap and the body may be movably connected to form a clearance between the cap and the body to allow outside air to enter the container and gas in the container to exit.

In another embodiment, the first check valve and the second check valve may be formed from rubber and may be injection molded with the valve seat.

In another embodiment, the first side of the valve seat is in fluidic communication with outside air in an outside environment. The second side of the valve seat is in fluidic communication with gas or vapor in the container. The first check valve may include a plurality of petals that open when the pressure at the first side of the valve seat exceeds the pressure at the second side of the valve seat by the first predetermined value, and the second check valve may include a plurality of petals that open when the pressure at the second side exceeds the pressure at the first side by the second predetermined value. The first and second check valves are closed when the pressure difference between the first side and the second side is between the first determined value and the second determined value. The petals of the first check valve may extend toward each other from the valve seat toward the container, and the petals of the second check valve may extend toward each other from the valve seat toward the cap.

In another embodiment, the first check valve and the second check valve each may include three petals.

In another embodiment, the body of the cap assembly may further include a bottom wall connected to the peripheral wall. The valve seat and the cap may form a first chamber in between, while the valve seat and the bottom wall may form a second chamber in between. In some embodiments, the bottom wall may include at least one through hole.

In another embodiment, the valve seat may include a first opening and a second opening. The first valve is configured to include at least three petals formed around the first opening and the second valve is configured to include at least three petals formed around the second opening. The petals of the first check valve extend toward each other and extend from the valve seat toward the container, and the petals of the second check valve are formed toward each other and extend from the valve seat toward the cap. When the first check valve and second check valve are closed, the petals of each valve contact with each other and at least partially overlap with each other. When the first check valve and second check valve open, the petals are at least partially separated to allow gas or air to pass through.

In another embodiment, the body of the cap assembly may include a fuel vapor absorbing material disposed between the cap and the valve seat.

According to another aspect of the present disclosure, a cap assembly to be connected to a fuel filler inlet of a fuel tank is provided. The cap assembly may comprise a cap, a body coupled to the cap, a valve seat connected to peripheral walls and disposed at a cross section of the body, a first check valve and a second check valve on the valve seat. The first and second check valves are spaced apart from each other and positioned in the opposite direction. The first check valve may include a first base fixed on the valve seat and a first elastic valve body connected to the first base, the first valve body may be disposed on a second side facing the fuel tank to be connected; the second check valve may include a second base fixed on the valve seat and a second elastic valve body connected to the second base. The second valve body is disposed on a first side facing the cap. The first check valve may open while the second check valve may remain closed when a pressure at the first side exceeds a pressure at the second side by a first predetermined value. The second check valve may open meanwhile the first check valve may remain closed when the pressure at the second side exceeds the pressure at the first side by a second predetermined value and the second predetermined value is greater than the first predetermined value.

In one embodiment, the cap assembly may further comprise a gasket sleeved on the peripheral wall such that the peripheral wall and the fuel filler inlet are sealed relative to each other when the cap assembly is connected to the filler inlet, and fuel vapor in the fuel tank and outside air external to the fuel tank are communicated via a fluid passage between the cap and the body through the first check valve or the second check valve.

In another embodiment, the gasket and the cap are spaced apart at a distance to enable the outside air to enter the first chamber via a fluid passage created by a clearance between the cap and the gasket and gas in the fuel tank may exit via that fluid passage.

In another embodiment, the peripheral wall may comprise a thread matching a filler inlet.

In another embodiment, the cap and the body are movably connected such that a fluid passage is formed between the cap and the body.

In another embodiment, the cap may comprise a flange surrounding the cap, the body may have a clip extending from the peripheral wall such that the clip is clipped in the flange.

In another embodiment, the body may further include a bottom wall connected to an end of the peripheral wall at a location that is away from the cap. The valve seat may be disposed between the bottom wall and the cap and the bottom wall may include a through hole.

In another embodiment, the first check valve and the second check valve may be integrally formed with the valve seat.

In another embodiment, the valve seat may include a first opening and a second opening, the first check valve may include a plurality of petals formed around the first opening, and the second check valve may include a plurality of petals formed around the second opening. The petals of the first check valve may be formed toward each other and extend from the valve seat toward the fuel tank to be connected, and the petals of the second check valve may be formed toward each other and extend from the valve seat toward the cap. The petals of each of the first and second valves may contact each other and at least partially overlap with each other when the first check valve and the second check valve are closed. The petals of each of the first and second valves are at least partially separated to allow air or gas to pass through when the first check valve or the second check valve opens.

According to another aspect of the present disclosure, a fuel filler inlet assembly of a vehicle is provided. The vehicle fuel filler inlet assembly may comprise: a filler inlet of a fuel tank and a cap assembly connected to the filler inlet. The cap assembly may include: a cap and a hollow body connected to the cap. The body may include a peripheral wall engaging the filler inlet, and a bottom wall connected to the peripheral wall. A valve seat may divide the body and form a first chamber between the valve seat and the cap, and a second chamber between the valve seat and the bottom wall. A first check valve and a second check valve may be integrally formed with the valve seat but positioned oppositely. The first check valve may include a plurality of petals made from elastic material and be positioned in the second chamber. The first check valve opens when the pressure in the first chamber exceeds a pressure in the second chamber by a first activation value to allow outside air external to the fuel tank to enter the fuel tank. The second check valve may include a plurality of petals made from elastic material and be positioned in the first chamber. The second check valve opens when the pressure in the second chamber exceeds the pressure in the first chamber by a second activation value to allow fuel vapor to exit the fuel tank.

In one embodiment, the second activation value of the second check valve may be greater than the first activation value of the first check valve.

In another embodiment, first check valve has less petals than the second check valve.

In another embodiment, the first cheek valve has two petals, and the second check valve has three petals.

In another embodiment, the first check valve may open at a first degree when the pressure in the first chamber exceeds the second chamber by the first activation value to allow the air to enter into the fuel tank at a first rate, and the first check valve may open at a second degree when a pressure difference between the first chamber and the second chamber is higher than a first activation value by a predetermined value to allow the air to enter into the fuel tank at a second rate. The second rate is greater than the first rate. The second check valve may open at a third degree when the pressure of the second chamber exceeds the first chamber by the second activation value to allow the fuel vapor in the fuel tank to exit the fuel tank at a third rate. And the second check valve may open at a fourth degree when the pressure difference between the first chamber and the second chamber is higher than the second activation value by a predetermined value to allow the fuel vapor to exit at a fourth rate. The fourth rate is greater than the third rate.

One or more advantageous features as described herein are believed to be readily apparent from the following detailed description of one or more embodiments when taken in connection with the accompanying drawings.

BRIEF DESCRIPTION OF THE DRAWINGS

Reference is now made to the one or more embodiments illustrated in greater detail in the accompanying drawings and described below wherein.

It should be noted that these figures are intended to illustrate the general characteristics of methods, structures and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION OF ONE OR MORE EMBODIMENTS

As required, detailed embodiments of the present invention are disclosed herein; however, it should be understood that the disclosed embodiments are merely examples of the invention that may be implemented in various and alternative forms. The figures are not necessarily drawn in scale; some features may be exaggerated or minimized to show details of particular components. As referenced in the figures, the same or similar reference numerals are used to refer to the same or similar components. In the following description, various operating parameters and components are described for different constructed embodiments. These specific parameters and components are included as examples and are not meant to be limiting. Therefore, specific structural and functional details disclosed herein are not to be interpreted as limiting, but merely as a representative basis for teaching one skilled in the art to implement the present invention in various manners.

As referenced in the figures, the same reference numerals may be used herein to refer to the same parameters and components or their similar modifications and alternatives. These parameters and components are included as examples and are not meant to be limiting. The drawings referenced herein are schematic and associated views thereof are not necessarily drawn to scale.

Figure 1:
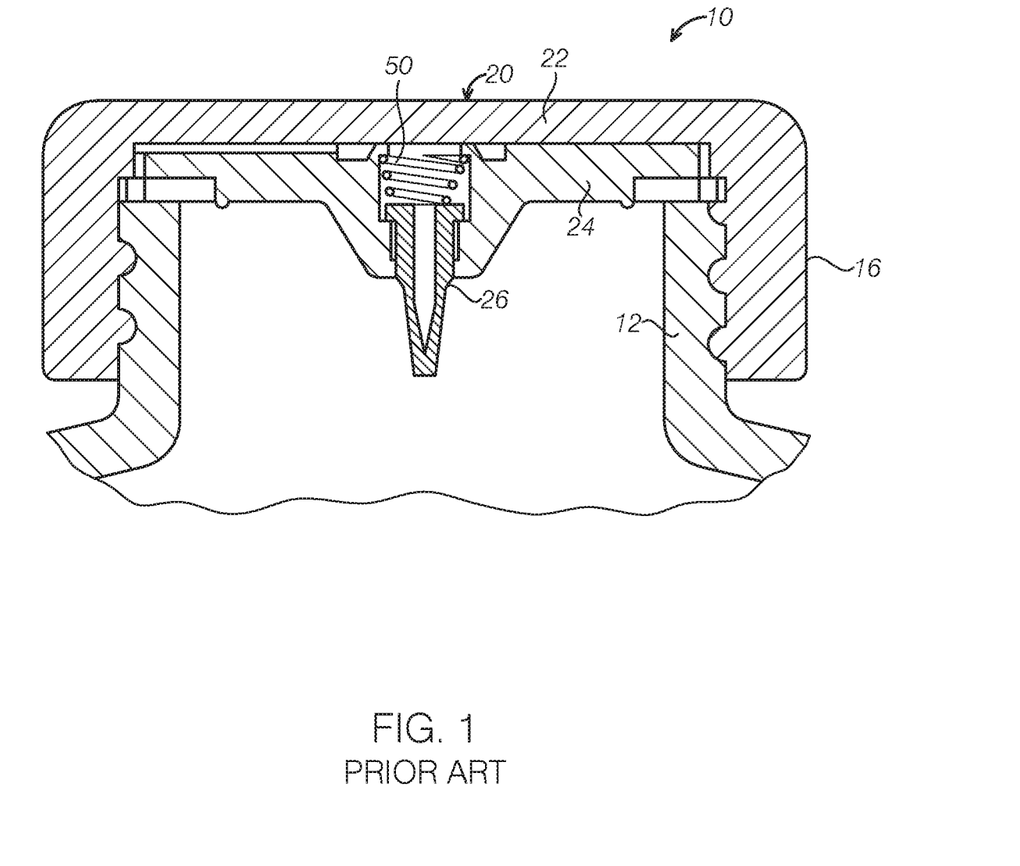
FIG. 1 schematically depicts a sectional view of a fuel tank cap having a vent valve in the prior art.

Vehicles may include different fluid storage devices, for instance including but not limit to a fuel tank, a hydraulic fluid container. To maintain a suitable pressure in the container, a vent valve or a pressure relief valve is provided at an opening or an inlet. For instance, FIG. 1 illustrates a fuel vent cap 10 in the prior art. The vent cap 10 includes a top wall assembly 20 and a peripheral flange 16. The peripheral flange 16 has a thread for attachment to an external periphery of a neck 12 of a fuel tank filler inlet. The top wall assembly 20 further includes a top panel member 22 and a valve support member 24 and a check relief valve element 26. The check relief valve element 26 is biased by a spring 50 to seat against the valve support member 24. The inventors have realized that, a more compact configuration may be designed to provide bidirectional pressure adjustment. And the spring may be omitted to improve NVH performance, and a lifespan issue caused by the mechanical frictions may be reduced or eliminated. Further, better seal performance may be achieved.

Figure 2:
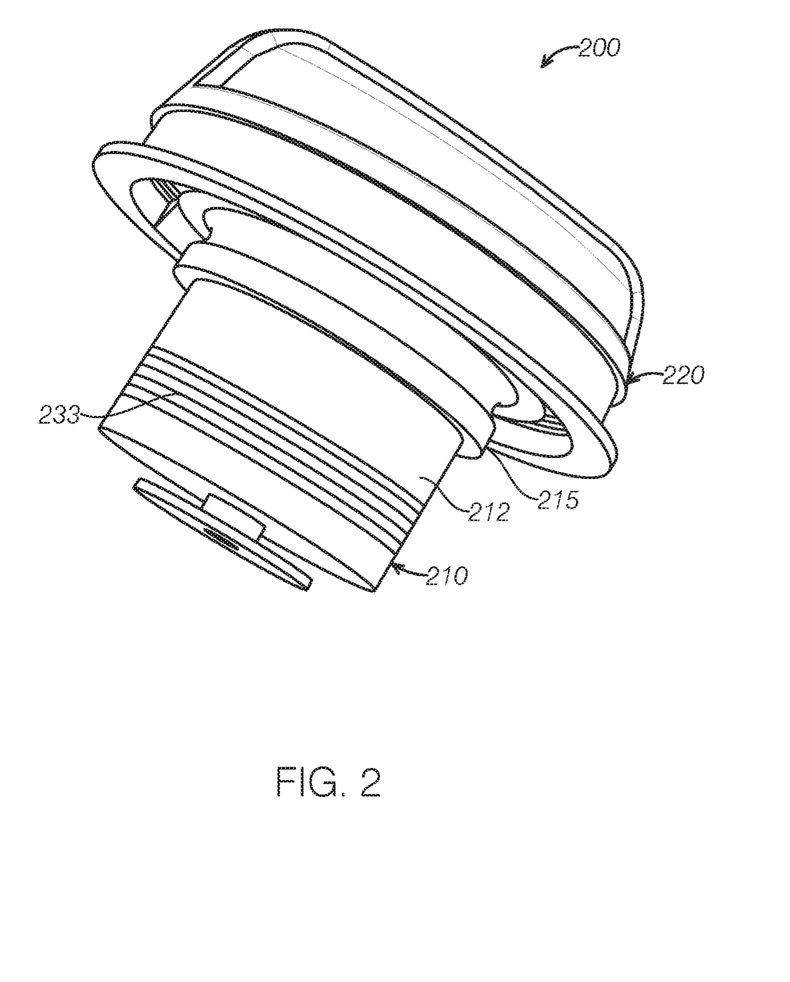
FIG. 2 schematically depicts a perspective view of a cap assembly according to one embodiment of the present disclosure.

FIG. 2 schematically depicts a cap assembly 200 according to one embodiment of the present disclosure. The cap assembly 200 can be used to seal a container that stores any suitable material such as fuel in a fuel system r fluid in a hydraulic system. In one or more embodiments, the container may be a fuel tank in a vehicle. The cap assembly 200 may be a cap assembly to be connected to a fuel filler inlet 202 of a fuel tank. The cap assembly 200 includes a body 210, a cap 220 connected to the body 210. In one embodiment, the body 210 includes a peripheral wall 212. The peripheral wall 212 has a thread 233 to be connected to an inner surface of the fuel filler inlet, for example. In another embodiment, the cap assembly may further include a gasket 215 sleeved on the body 210 to seal the cap assembly 200 with the filler inlet 202 of the container. Detailed structural features of the body 210, a peripheral wall 212, a gasket 215 and their connection may be referred to the application CN201610892545.7, the entire disclosure is incorporated by reference herein. The cap assembly 200 of the present disclosure may have a similar construction, the differences are the structure and arrangement of the check valve. The check valves according to one or more embodiments of the present disclosure are positioned in the body 210.

Figure 3:
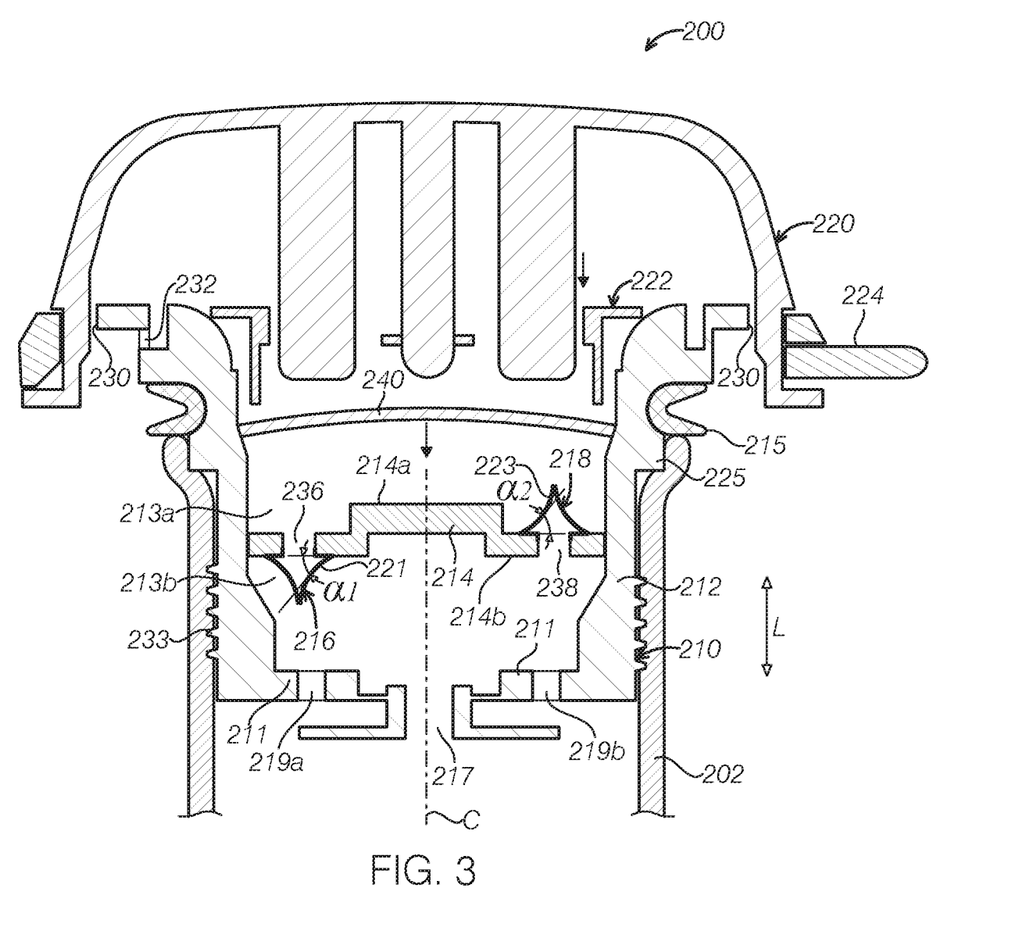
FIG. 3 schematically depicts a sectional view of a cap assembly in FIG. 2.

FIG. 3 schematically depicts a sectional view of the cap assembly 200 according to one embodiment of the present disclosure. In one embodiment, the cap assembly 200 includes the body 210 and the cap 220 coupled to the body 210. In the depicted embodiment, the cap 220 includes a ratchet mechanism 222, the details of which may refer to the application CN201610892545.7 and will be omitted here for brevity. It will be appreciated that the ratchet mechanism 222 in the cap 220 may not be necessary in the embodiment of the present disclosure. In other embodiments, the cap 220 may have a simplified inner structure. In some embodiments, the cap assembly 200 includes a ring 224 movably connected to the outer surface of the cap 220. The ring 224 may be connected to a vehicle body such that it is easy for a user to fetch and the cap assembly 200 will not easily be lost. In some embodiments, the body 210 includes a peripheral wall 212, a bottom wall 211 and a valve seat 214 extending from the peripheral wall 212 to the central axis C of the body 210. In one embodiment, the body 210 may be a hollow cylinder. The valve seat 214 may be disposed on the cross section of the body at a lengthwise direction L of the body 210. The valve seat 214 includes a first side 214a facing the cap 220 and a second side 214b facing away from the cap 220 or facing toward a fuel tank or a container to be connected. The first side 214a of the valve seat 214 and the cap 220 form a first chamber 213a. The second side 214b of the valve seat 214 and the bottom wall 211 form a second chamber 213b.

In one embodiment, the valve seat 214 includes a first check valve 216 and a second check valve 218. The first check valve 216 has a first valve body 221 located at the second side 214b of the valve seat 214. In other words, the first valve body 221 of the first check valve 216 is disposed in the second chamber 213b. The second check valve 218 has a second valve body 223 located at the first side 214a of the valve seat 214. In other words, the second valve body 223 of the second check valve is disposed in the first chamber 213a. The first check valve 216 and the second check valve 218 are disposed in the opposite direction and fluid flow directions from the first check valve 216 and the second check valve 218 are opposite.

In one or more embodiments, the valve bodies 221, 223 of the first check valve 216 and the second check valve 218 may be formed by elastic material. The elastic material may be heat resistant and oil proof, and may include appropriate rubber, for instance fluorinated silicone rubber, nitrile rubber etc. In one or more embodiments, the first check valve 216 and the second check valve 218 may be injection molded and formed integrally with the valve seat 214. The integrally formed check valve and the valve seat can provide strong connection between the valve seat and the valve body and achieve good sealing performance. Since no additional coupling is required for the integral formed configuration, the time and labor for the additional assembling are saved.

Continuing with FIG. 3, in one or more embodiments, the gasket 215 may be sleeved on an outer surface 225 of the peripheral wall 212 of the body 210 such that the cap assembly 200 is coupled with the filler inlet 202 of a container or a fuel tank in a tight manner. That is, the peripheral wall 212 of the body 210 can be substantially sealed against the filler inlet with the gasket 215 to avoid leaking of the gas flow through a clearance between the peripheral wall 212 and the filler inlet 202 when the cap assembly 200 is connected to the filler inlet 202. The gasket 215 may be spaced apart from the cap 220 in the direction L such that outside air in the environment or atmosphere external to the fuel tank may flow through a fluid passage 230 created by a clearance between the cap 220 and the gasket 215 into the first chamber 213a and the fuel vapor in the fuel tank can exit through the fluid passage 230 as well. That is, the outside air in the environment will be in fluidic communication with the fuel vapor or gas in the container or the fuel tank. The paths of the air and gas are shown via the arrow in the drawings.

The body 210 of the cap assembly 200 includes a channel 217 opens to the container or fuel tank and is in fluidic communication with the vapor in the fuel tank. The fluid or particularly the vapor in the fuel tank may only be communicated with the outside air in the environment via the first check valve 216 and/or the second check valve 218 by passing through the opening 217 and the fluid passage 230. In one or more embodiments, the body 210 and the cap 220 are movably connected thereby forming a fluid passage 230 in between to allow fluidic communication between the fuel tank and the outside environment. In some embodiments, an auxiliary or additional opening 232 may be formed at a joint of the cap 220 and the body 210, or at a place between the gasket 215 and the cap 220 to improve fluid flow efficiency.

Figure 4:
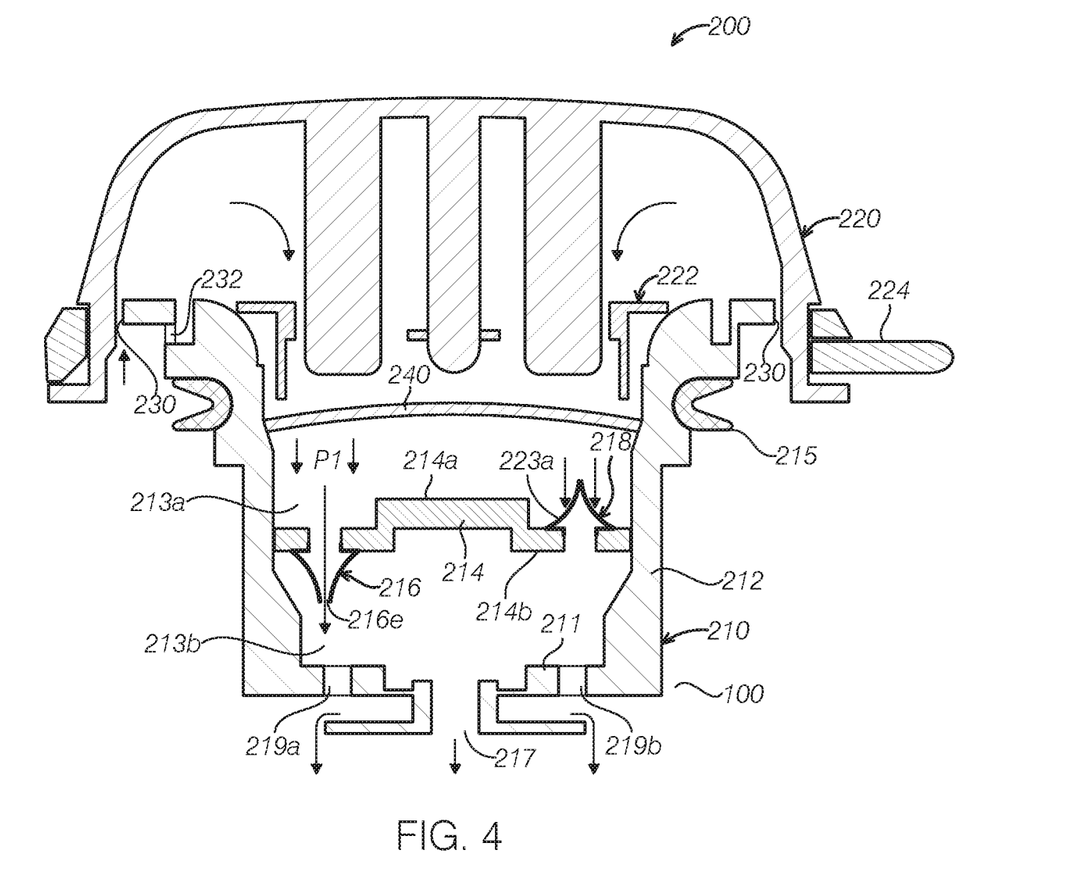
FIG. 4 schematically depicts the embodiment shown in FIG. illustrating an opening and closing status of the valves of the cap assembly in FIG. 3 at one pressure condition.
Figure 5:
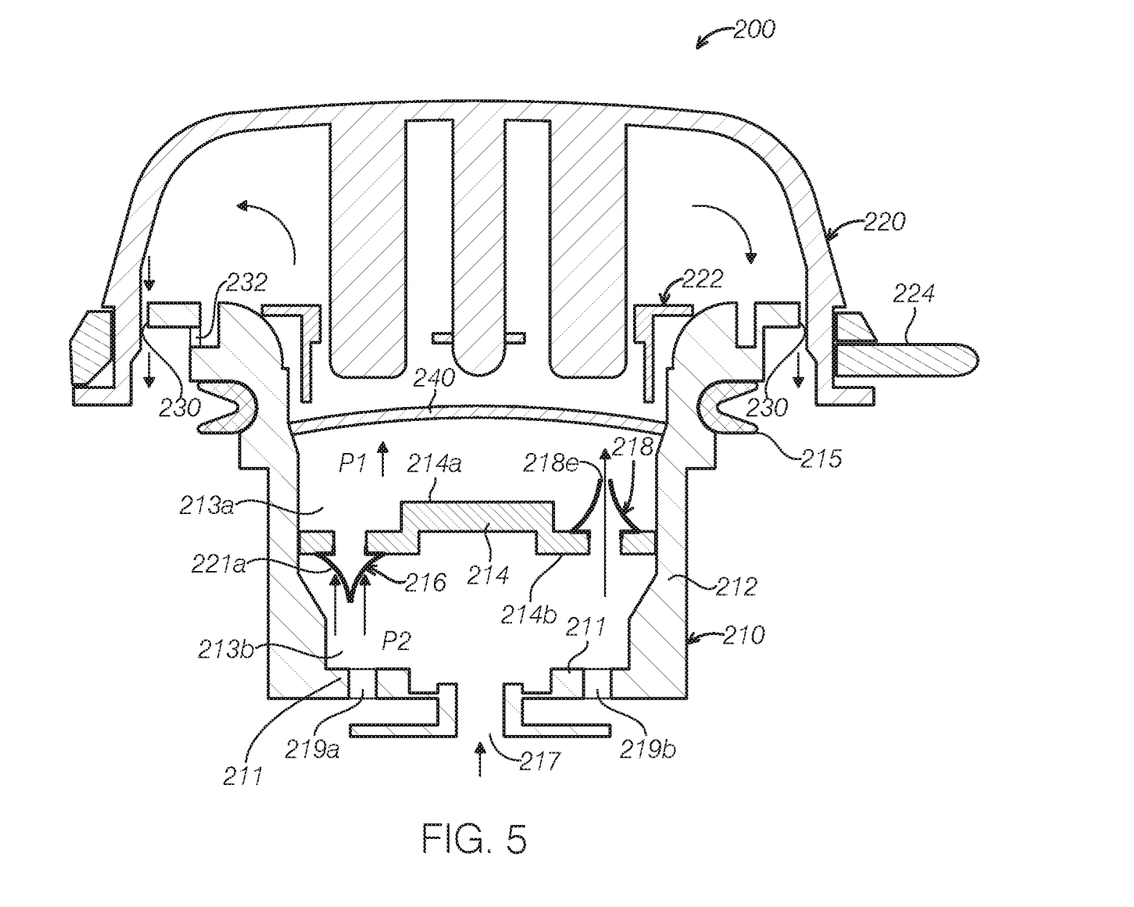
FIG. 5 schematically depicts the embodiment shown in FIG. 3, illustrating an opening and closing status of the valves of the cap assembly in FIG. 3 at another pressure condition.

FIG. 4 and FIG. 5 illustrates valve opening status of the cap assembly 200 under different pressures. The fluid path is shown by the arrow in the figures. Operation of the cap assembly 200 according to the present disclosure will be explained with reference to the FIG. 4 and FIG. 5. As shown in FIG. 4, when a pressure P1 at the first side 214a of the valve seat 214 exceeds a pressure P2 at the second side 214b by a first predetermined value A, the first check valve 216 is activated due to the pressure difference. That is, the first check valve has a first activation value A. It will be appreciated that the first predetermined value and the first activation value are used interchangeably in this application. Meanwhile for the second check valve 218, the vapor presses against an outer surface 223a of the second check valve 218 and therefore the second check valve 218 remain closed. When the pressure P1 at the first side 214a of the valve seat 214 exceeds the pressure P2 of the second side 214b by a greater value, that is when the pressure difference is greater, the first check valve 216 opens at a greater extent to enhance the capability to release the pressure or maintain the pressure at a desired value. The first activation value A may be determined taking in consideration of fuel tank parameters (for example a pressure the fuel tank can stand). In one embodiment, the first activation value A may be about 6.5 Pkpa.

As shown in FIG. 5, when the pressure P2 at the second side 214b exceeds the pressure P1 at the first side 214a by a second predetermined value B, the second check valve 218 is activated. That is, the second check valve may have a second activation value B. Meanwhile the vapor press against an outer surface 221a of the first check valve 216 such that the first check valve 216 remains closed. It will be appreciated that the second predetermined value and the second activation value are used interchangeably in this application. When the pressure in the first chamber 213a exceeds the second chamber 213b by the first activation value, the first check valve 216 opens at a first degree to allow the air to enter the fuel tank at a first rate. When the pressure at the first chamber 213a exceeds the second chamber 213b by a pressure value that is greater than the first activation value by a certain value, the first check valve 216 opens at a second degree to allow the air to flow into the fuel tank at a second rate. The second rate is greater than the first rate. In this way, the pressure maintaining or pressure relief capability is improved. In one embodiment, the second activation value B is different from the first activation value A. In one example, the second activation value B may be about 5 Kpa. The second activation value B may be set taking into consideration of parameters of the fuel tank (for example pressure that fuel tank could stand and an amount of the vapor allowed to be released). Similarly, the second check valve 218 opens at a third degree when the pressure of the second chamber 213b exceeds the first chamber 213a by the second activation value B to allow the fuel vapor in the fuel tank to exit the fuel tank at a third rate. The second check valve 218 opens at a fourth degree to allow the fuel vapor to exit at a fourth rate when the pressure in the second chamber 213b exceeds the pressure in first chamber 213a by a pressure value that is higher than the second activation value by a certain value. The fourth rate is greater than the third rate.

The first, second third and fourth degrees refer to an opening extent of the first and second check valve. At different opening extents, the flow rate of gas/air passing the check valve are different. In some embodiments, the first and second check valves are configured such that the relationship of the flowrate and the opening extent of the first and second check valves are nonlinear.

When the pressure difference between the pressure P1 at the first side 214a of the valve seat 214 and the pressure P2 at the second side 214b is less than the first predetermined value A or the second predetermined value B, the first check valve 216 and the second check valve 218 remain closed. In other words, the valves are designed to be closed at a range of pressure difference, and no fluid communication between the first chamber and the second chamber is permitted under such circumstances. Only when the pressure difference is greater than a predetermined value, the fluid/gas/vapor is released to maintain desired pressure.

In one or more embodiments, the second valve activation value B of the second check valve 218 is configured to be greater than the first valve activation value A of the first check valve 216. That is, under the higher pressure, the second check valve 218 may be activated. The first check valve 216 and the second check valve 218 may have a different structure and the details of which may be understood better with reference to FIG. 7 and FIG. 8.

First check valve 216 and second check valve 218 are provided separately on the valve seat in the depicted embodiments, and thus robust pressure relief and control can be achieved, and flexibility of design is allowed. And as no metal component is included, no physical friction occurs and thus better NVH performance is provided. In one embodiment, the first check valve 216 and the second check valve 218 are spaced apart from each other and are substantially disposed symmetrically. In another embodiment, the body 210 has a plurality of openings at the bottom, for instance the auxiliary opening 219a and 219b. The first check value 216 and the second check valve 218 are disposed adjacent to the auxiliary opening 219a and 219b, respectively. Although the first check valve 216 and the second check valve 218 are shown to be positioned at the edge portion of the valve seat 214, it will be appreciated that the first check valve 216 and the second check valve 218 may be positioned close to the central axis C of the valve seat 214, and the body 210 may include a plurality of openings corresponding to the first and second check valves 216 and 218.

Refer to FIG. 3 through FIG. 5, in some embodiments, the cap assembly 200 may be a fuel filler cap assembly 200 to cover a fuel filler inlet 202. The filler cap assembly 200 includes a cap 220, the hollow body 210 coupled to the cap 220. And the peripheral wall 212 of the body may be engaged with an inner surface of the filler inlet 202. The body 210 similarly has the valve seat 214 extending from the peripheral wall 212 to the central axis C of the body 210. The valve seat 214 is disposed on the cross section of the body 210. The first side 214a of the valve seat 214 and the cap 220 form a first chamber 213a in between. The second side 214b of the valve seat 214 and the bottom wall 211 form a second chamber 213b in between. The valve seat 214 includes the first check valve 216 and the second check valve 218 positioned on the valve seat 214 in opposite directions and integrally formed with the valve seat 214. The first body of the first check valve 216 is made from elastic material and disposed in the second chamber 213b. The second valve body of the second check valve 218 is made from elastic and is disposed in the first chamber 213a. The first check valve 216 opens when the pressure P1 in the first chamber 213a exceeds the pressure P2 in the second chamber 213b by a first activation value to allow air to enter the fuel tank. The second check valve 218 similarly has a second elastic valve body in the first chamber 213a. The second check valve 218 opens when the pressure P2 in the second chamber 218 exceeds the first chamber 216 by a second activation value to allow fuel vapor to be exhausted from the fuel tank.

In one or more embodiments, fuel vapor absorbing material 240 is disposed in the body 210. For instance, fuel vapor absorbing material 240 may be disposed in the first chamber 213a. Fuel vapor absorbing material 240 may be any appropriate material that absorbs fuel vapor while allowing pass of air flow. For instance, a carbon or polymer adsorbent membrane available in the market may be used. When the pressure in the fuel tank is built up, the fuel vapor passing through the second check valve 218 may be substantially trapped by the fuel vapor absorbing material 240 without releasing into the atmosphere. The fuel vapor material 240 may be replaced during maintenance of the vehicle when the absorption capacity is reached.

Continuing with FIG. 3 through FIG. 5, in one embodiment, the cap assembly 200 is used to cover the fuel filler inlet 202 of a fuel tank, and the peripheral wall 212 may include thread 233 to match the thread on the fuel filler inlet 202. And the gasket 215 is sleeved on the peripheral wall 212 and is disposed close to the cap 220 such that the peripheral wall 212 is substantially sealed relative to the filler inlet when the filler cap 200 is connected to the fuel filler inlet 202. The fuel vapor may only be communicated with the outside environment through the first check valve 216 and/or the second check valve 218. In one embodiment, a fluid passage 230 (or a clearance) is formed between the cap 220 and the body 210 via the movable connection between the cap 220 and the body 210. In some embodiments, additional openings 232 may be formed. In one embodiment, the gasket 215 may be disposed between the threads 233 (or other connection means) of the body 210 and the fluid passage 230 (and openings 232). That is, the fluid passage 230 and the openings 232 are exposed to the outside environment or fluidically communicated with the outside air. In this way, the gasket 215 does not prevent the air to enter the cap 220 and the gas inside the fuel tank to exit the cap 220.

Figure 6:
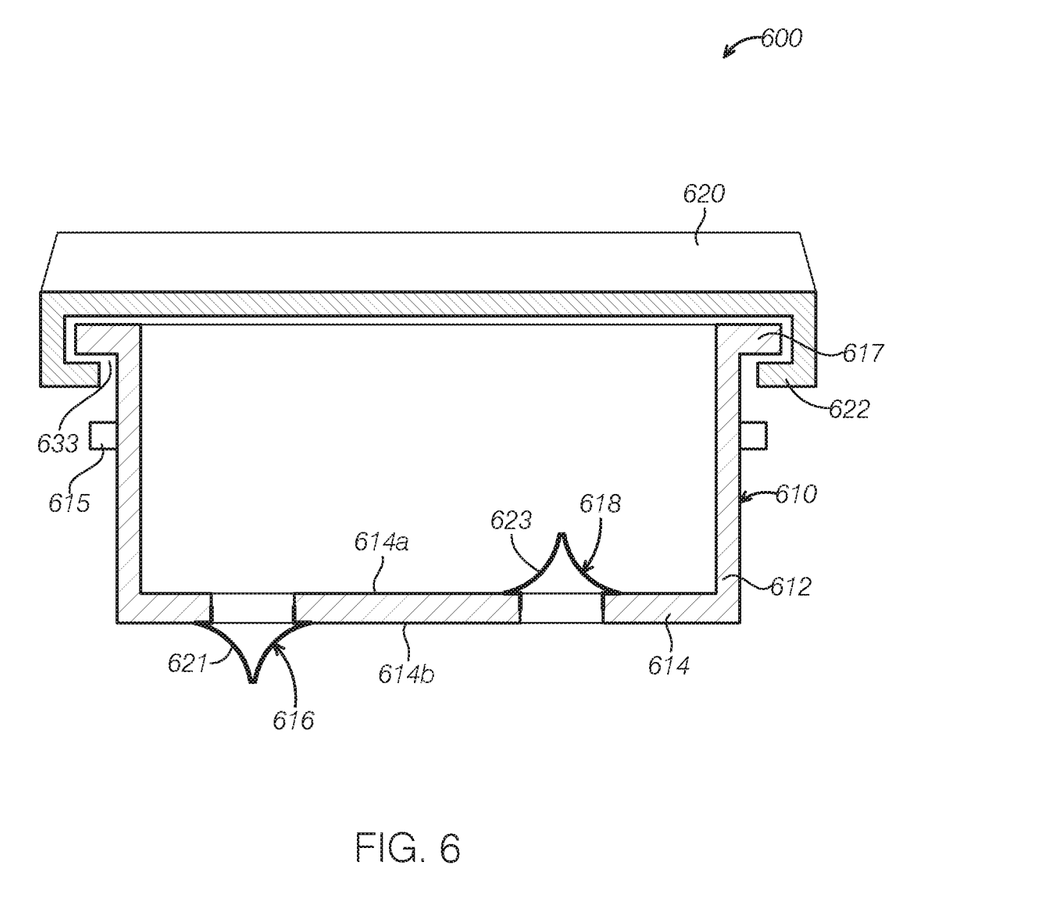
FIG. 6 schematically depicts a sectional view of a cap assembly according to another embodiment of the present disclosure.

FIG. 6 illustratively depicts a sectional view of a cap assembly 600 according to another embodiment of the present disclosure. In the depicted embodiment, the cap assembly 600 includes a body 610 and a cap 620 coupled to the body 610. In the depicted embodiment, the body 610 includes a peripheral wall 612 and a valve seat 614 extending from the peripheral wall 612 to a central axis of the body 610. The valve seat 614 includes a first side 614a facing the cap 620 and a second side 614b facing away from the cap 620. The first side 614a of the valve seat 614 and the cap 620 form a first chamber 613. In the depicted embodiment, no bottom wall under the valve seat 614 is provided as compared to the above described cap assembly 200. In one embodiment, the valve seat 614 further includes a first check valve 616 and a second check valve 618. The first check valve 616 has a first valve body 621 located at the second side 614b of the valve seat 614. The second check valve 618 has a second valve body 623 located at the first side 614a of the valve seat 614, that is, located in the first chamber 613. The first check valve 616 and the second check valve 618 are positioned in an opposite direction. In some embodiments, the cap 620 may include a flange 622 around the cap 620, and the body 610 has a clip 617 extending from the peripheral wall 612 and clipped in or snapped in the flange 622. It will be appreciated that other connection means may be adopted to connect the body 610 and the cap 620. Further, a fluid passage 633 is formed between the body 610 and the cap 620. In some embodiments, the cap assembly 600 may further include a gasket 615 sleeved on the body 610. The gasket 615 is disposed on the peripheral wall 612 at an end portion that is closer to the cap 620 such that the peripheral wall 612 is sealed against an inlet of a container to be covered when the cap assembly 600 is closed, such that the gas in the atmosphere and the gas in the container can only be communicated via the fluid passage 633 through the first check valve 616 and/or the second check valve 618. That is, the gasket 615 is positioned such that air is allowed to enter the cap 620 via the fluid passage 633 and the gas in the container can be released from the container to the atmosphere via the fluid passage 633. The operation of the cap assembly 600 is similar to that of the cap assembly 200 and the details of which will be omitted here for brevity.

Figure 7:
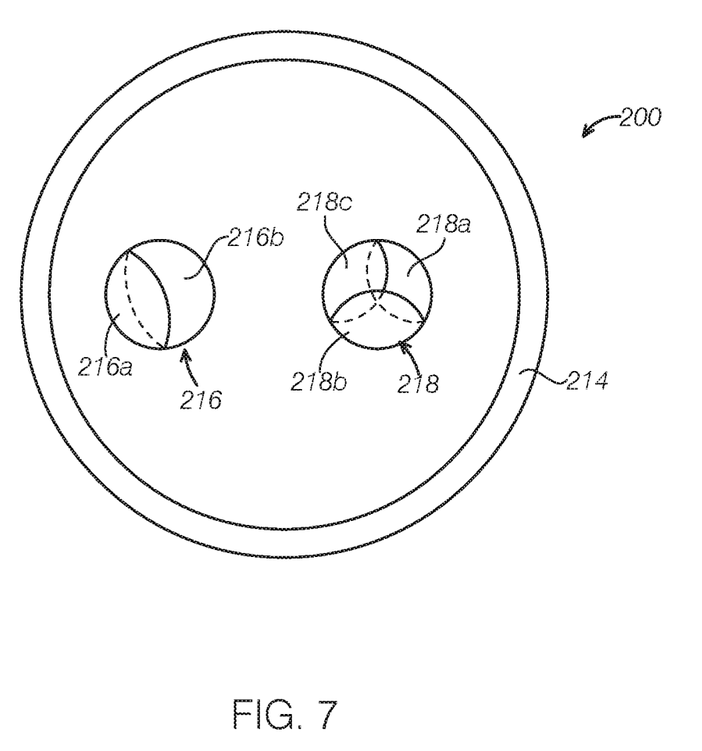
FIG. 7 schematically depicts a top view of the valve seat and valve body according to one embodiment of the present disclosure.
Figure 8:
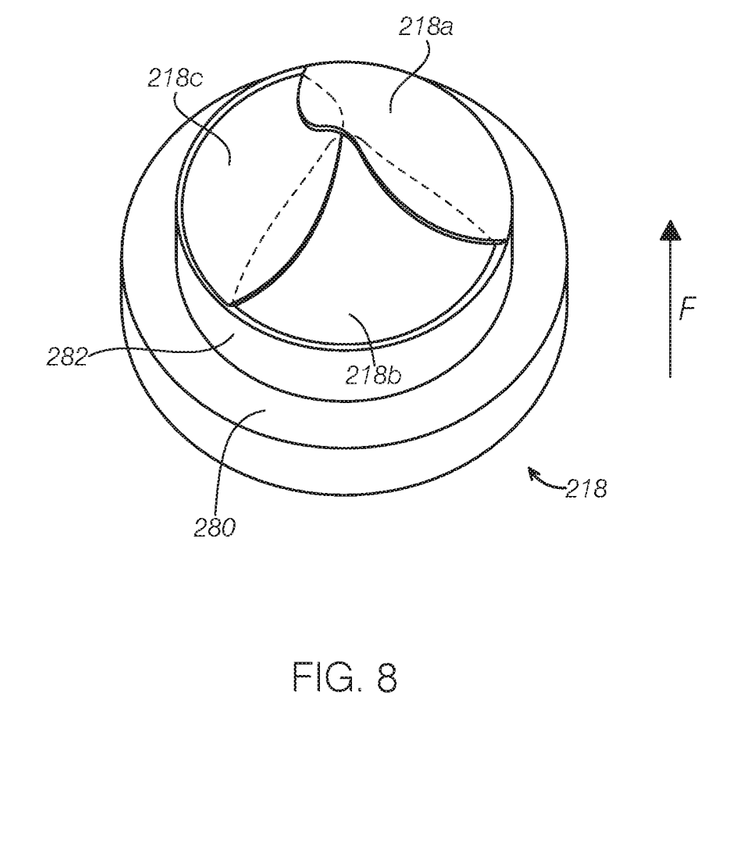
FIG. 8 schematically depicts a perspective view of the valve body according to one embodiment of the present disclosure.

FIG. 7 illustratively depicts a top view of the first check valve 216 and the second check valve 218 of the cap assembly 200 in FIG. 3. FIG. 8 illustratively depicts a perspective view of the second valve 218 according to one embodiment of the present disclosure. The cap assembly 200 is discussed herein as an example, and it should be appreciated that the first and the second valves of the cap assembly 600 may have a similar configuration. The first check valve 216 and the second check valve 218 may be integrated with the valve seat 214. In one embodiment, when the fuel tank is under a negative pressure, the first check valve 216 may be set to allow outside air to enter the fuel tank to allow pressure adjustment, and a relatively lower first activation value A may be set. With further reference to FIG. 2 through FIG. 5, in one embodiment, the valve seat 214 may include a first opening 236, the first check valve 216 may be configured to include two elastic petals 216a and 216b. FIG. 7 depicts the first check valve 216 at a closed status. In the depicted embodiment, the petals 216a and 216b contact each other and at least partially overlap at the closed status. During the opening event of the first check valve 216, the petals are at least partially separated to allow fluid to flow through.

FIG. 7 further depicted the second check valve 218. In one embodiment, the second check valve 218 may be configured to open when the accumulated vapor pressure in the container (e.g., the fuel tank) reaches a predetermined value to release a small amount of vapor. Therefore, a higher second activation value B may be set. In one embodiment, the second check valve 218 may have same structure as the first check valve 216. For example, the s check valve 218 may similarly have two petals, while the petals may be thicker than the first check valve 216 such that the second activation value B is higher. In another embodiment, the second check valve 218 may have a different configuration from the first check valve 216. For instance, the second check valve 218 may have more petals than the first check valve 216. In some embodiments, the petals of the first check valve may form a first angle α1 to a surface of the valve seat 214 and the petals of the second check valve 218 may form a second angle α2 to the surface of the valve seat 214 and the second angle α2 is different from the first angle α1. The angles α1, α2 may be formed between the valve seat 214 and the petals of the first check valve 216 and the petals of the second check valve 218, respectively. In some embodiments, the petals have curved surfaces. The angles α1 and α2 may be the angles of tangent line of the surfaces of the petals with the valve seat 214 at a location close to an exit port 216e of first valve 216 and an exit port 218e of the second valve 218. The exit port 216e or 218e refers to an aperture that allows the gas or air to exit from the valve when the valve opens. The exit port may be defined by the tip portion of the petals. The second check valve 218 depicted in the FIG. 7 and FIG. 8 includes three petals 218a, 281b, and 218c facing toward each other. The petals 218a, 281b, and 218c extend from the valve seat 214 toward a cap 220. When the second check valve 218 is closed, the petals contact each other and are at least partially overlapped. Three petal configuration can create an increased overlapped area or contact area, which enables the second activation value B to be larger than the first activation value A, when the second check valve 218 is activated, the petals are at least partially separated to allow the gas or vapor to pass through. It will be appreciated that the number of petals may vary as necessary. For instance, the first check valve may include three petals and the second check valve may include four petals.

Refer to FIG. 3 and FIG. 8, the second check valve 218 includes a base 280 and a valve body 282 having the petals 218a, 218b, 218c. The base 280 and the valve body 282 may be formed by elastic material. The base 280 may be injection molded on the valve seat 214. In the depicted embodiment, at the closed status, the petals 218a, 218b and 218c protrude away from the base 280. In some embodiments, at the closed status, the petals 218a, 218b and 218c may recess toward the base 280 such that the activation pressure for the second check valve may be increased. In other embodiments, there are no clear boundaries between the base 280 and the valve body 282 or petals. The valve body 282, the petals and the base 280 may be formed integrally with the valve seat 214.

In one or more embodiments, overlapped petals may improve sealing performance. For instance, partially overlapped petals may be more robust and less possible to leak inadvertently. The overlapping area of the petals may be adjusted to set an appropriate activation pressure value. Comparing with a metal spring biased valve body, the elastic petals can have reduced ME and decreased aging caused by physical friction and can reduce or eliminating leaking. Additionally, when the pressure difference (P1–P2) reaches a valve activation value, the valve is activated to release the pressure at a slow speed. On the other hand, the petal configuration also allows for a rapid release rate needed at some conditions. For example, when the pressure difference is high (e.g., a pressure surge at some condition), a high flow rate is needed to release the pressure rapidly. As the petals can be separated to provide a large opening, a greater pressure relief capability can be provided. That is, the valve of the present disclosure can provide a greater pressure release rate than a valve having a linear spring. Compared to a valve including a bias spring which has a linear pressure releasing capability, the valve with elastic petals of the present disclosure can allow a slow rate at a small pressure difference and a greater nonlinear rate at a large pressure difference.

As described in the specification, one or more embodiments of the present disclosure provide a cap assembly having a pressure relief valve. The cap assembly may be applicable to any appropriate containers, particularly fluid containers that are required to maintain a desired pressure range. By adopting a valve body made from elastic material and integrating the valve body with the valve seat of the cap assembly, the manufacturing process can be simplified. Further, the gas release rate of the valve can adapt to the pressure difference to achieve a desired range in the container. As the opening and closing of the valve does not involve the contacts of the metal part, NVH performance is improved. Additionally, because physical movement and friction between the valve parts are minimized, the aging resulted from such actions can be reduced and sealing problem may be improved or solved. Although the cap assembly of the present disclosure is discussed under the context of fuel tanks, it could be appreciated that the cap assembly may be used in other appropriate applications. Those who skilled in the art will readily recognize from such discussion, and from the accompanying drawings and claims that various changes, modifications and variations can be made therein without departing from the true spirit and fair scope of the invention as defined by the following claims.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

What is claimed is:

1. A cap assembly for a container, comprising:
   a cap;
   a body coupled to the cap, wherein the body includes a peripheral wall and a valve seat extending from the peripheral wall to a central axis of the body, and the valve seat includes a first side facing the cap and a second side facing away from the cap;
   a first check valve made of elastic material having a first valve body positioned at the second side of the valve seat;
   a second check valve made of elastic material having a second valve body positioned at the first side of the valve seat;
   wherein, when a pressure at the first side of the valve seat exceeds a pressure at the second side of the valve seat by a first predetermined value, the first check valve opens; and when the pressure at the second side exceeds the pressure at the first side by a second predetermined value, the second check valve opens;

wherein the body further includes a bottom wall connected to the peripheral wall and positioned under the valve seat, wherein the first side of the valve seat and the cap forms a first chamber, and the second side of the valve seat and the bottom wall forms a second chamber, wherein the first check valve is positioned inside the second chamber and the second check valve is positioned inside the first chamber.

2. The cap assembly of claim 1, wherein the cap and the body are movably connected to form a clearance between the cap and the body to allow outside air to enter the container and gas in the container to exit.

3. The cap assembly of claim 1, wherein the first check valve and the second check valve are formed from rubber and are injection molded with the valve seat.

4. The cap assembly of claim 1, wherein the first side of the valve seat is in fluidic communication with outside air in an outside environment, and the second side of the valve seat is in fluidic connection with gas in the container, wherein the first check valve includes a plurality of petals that open when the pressure at the first side of the valve seat exceeds the pressure at the second side of the valve seat by the first predetermined value, the second check valve includes a plurality of petals that open when the pressure at the second side exceeds the pressure at the first side by the second predetermined value; the first and second check valves are closed when a pressure difference between the first side and the second side is less than the first determined value and the second determined value, and wherein the petals of the first check valve extend toward each other from the valve seat toward the container, and the petals of the second check valve extend toward each other from the valve seat toward the cap.

5. The cap assembly of claim 4, wherein the first check valve includes two petals and the second check valve includes three petals.

6. The cap assembly of claim 1, wherein the bottom wall includes at least one through hole.

7. The cap assembly of claim 1, wherein the valve seat includes a first opening and a second opening, the first check valve is configured to include at least three petals formed around the first opening and the second check valve is configured to include at least three petals formed around the second opening, wherein the petals of the first check valve are formed toward each other and extend from the valve seat toward the container, wherein the petals of the second check valve are formed toward each other and extend from the valve seat toward the cap; and when the first check valve and the second check valve are closed, the petals of each valve contact each other and at least partially overlap with each other; and when the first check valve and the second check valve open, the petals are at least partially separated to allow gas or air to pass through.

8. The cap assembly of claim 1, wherein the body includes a fuel vapor absorbing material disposed between the cap and the valve seat.

9. A cap assembly for use with a fuel filler inlet of a fuel tank, the cap assembly comprising,
a cap;
a body coupled to the cap;
a valve seat connected to a peripheral wall and disposed at a cross section of the body;
a first check valve and a second check valve spaced apart from each other, wherein the first check valve includes a first base fixed on the valve seat and a first elastic valve body connected to the first base, the first valve body is disposed on a second side facing the fuel tank to be connected; the second check valve includes a second base fixed on the valve seat and a second elastic valve body connected to the second base, and disposed on a first side facing the cap; wherein the first check valve opens while the second check valve remains closed when a pressure at the first side exceeds a pressure at the second side by a first predetermined value, and the second check valve opens while the first check valve remains closed when the pressure at the second side exceeds the pressure at the first side by a second predetermined value and the second predetermined value is greater than the first predetermined value.

10. The cap assembly of claim 9, further comprising a gasket sleeved on the peripheral wall such that the peripheral wall and the fuel filler inlet are sealed relative to each other when the cap assembly is connected to the fuel filler inlet, and fuel vapor in the fuel tank and outside air external to the fuel tank are communicated via a fluid passage between the cap and the body and the first check valve or the second check valve.

11. The cap assembly of claim 10, wherein the gasket and the cap are spaced apart at a distance to enable the outside air to enter a first chamber formed between the cap and a first side of the valve seat via a fluid passage created by a clearance between the cap and the gasket and enable fuel vapor in the fuel tank to exit via the fluid passage.

12. The cap assembly of claim 9, wherein the cap and the body are movably connected such that a fluid passage is formed between the cap and the body.

13. The cap assembly of claim 9, wherein the body further includes a bottom wall connected to an end of the peripheral wall at a location away from the valve seat, wherein the valve seat is disposed between the bottom wall and the cap, and wherein the bottom wall includes a through hole.

14. The cap assembly of claim 9, wherein the first check valve and the second check valve are integrally formed with the valve seat.

15. The cap assembly of claim 9, wherein the valve seat includes a first opening and a second opening, the first check valve includes a plurality of petals formed around the first opening, and the second check valve includes a plurality of petals formed around the second opening, wherein the petals of the first check valve are formed toward each other and extend from the valve seat toward the fuel tank to be connected, wherein the petals of the second check valve are formed toward each other and extend from the valve seat toward the cap, wherein the petals of each of the first and second valves contact each other and at least partially overlap with each other when the first check valve and the second check valve are closed, and wherein the petals of each of the first and second valves are at least partially separated to allow air or gas to pass through when the first check valve and the second check valve are opened.

16. A fuel filler inlet assembly of a vehicle, comprising:
a filler inlet of a fuel tank; and
a cap assembly connected to the filler inlet, the cap assembly includes:
a cap,
a hollow body connected to the cap, the body includes a peripheral wall engaging the filler inlet, and a bottom wall connected to the peripheral wall,
a valve seat dividing the body and forming a first chamber between the valve seat and the cap, and a second chamber between the valve seat and the bottom wall, a first check valve and a second check valve integrally formed with the valve seat, the first check valve and second check valves are positioned in opposite directions, wherein the first check valve includes a plurality of petals made from elastic material and positioned in the second chamber, the first check valve opens when a pressure in the first chamber exceeds a pressure in the second chamber by a first activation value to allow outside air external to the fuel tank to enter into the fuel tank, wherein the second check valve includes a plurality of petals made from elastic material and positioned in the first chamber, the second check valve opens when the pressure in the second chamber exceeds the pressure in the first chamber by a second activation value to allow fuel vapor to exit the fuel tank.

17. The fuel filler inlet assembly of claim 16, wherein the first check valve opens at a first degree when the pressure in the first chamber exceeds the second chamber by the first activation value to allow the outside air enter into the fuel tank at a first rate, and the first check valve opens at a second degree when a pressure difference between the first chamber and the second chamber is higher than a first activation value by a predetermined value to allow the outside air to flow into the fuel tank at a second rate, wherein the second rate is greater than the first rate; wherein the second check valve opens at a third degree when the pressure of the second chamber exceeds the first chamber by the second activation value to allow the fuel vapor in the fuel tank to exit the fuel tank at a third rate, and the second check valve opens at a fourth degree when the pressure difference between the first chamber and the second chamber is higher than the second activation value by a predetermined value to allow the fuel vapor to exit at a fourth rate, and wherein the fourth rate is greater than the third rate.

18. The fuel filler inlet assembly of claim 16, wherein the second activation value of the second check valve is greater than the first activation value of the first check valve.

19. The fuel filler inlet assembly of claim 16, wherein the first check valve has less petals than the second check valve.

20. The fuel filler inlet assembly of claim 16, wherein the first check valve has two petals, and the second check valve has three petals.

\* \* \* \* \*